Aug. 31, 1965     H. W. McQUAID ETAL     3,203,824
METHOD AND APPARATUS FOR CLADDING METAL TUBES
Filed Feb. 1, 1962     2 Sheets-Sheet 1

INVENTORS
HARRY W. McQUAID &
WILLIAM L. ULMER
BY
Alfred C. Body
ATTORNEY

Aug. 31, 1965  H. W. McQUAID ETAL  3,203,824
METHOD AND APPARATUS FOR CLADDING METAL TUBES
Filed Feb. 1, 1962  2 Sheets-Sheet 2
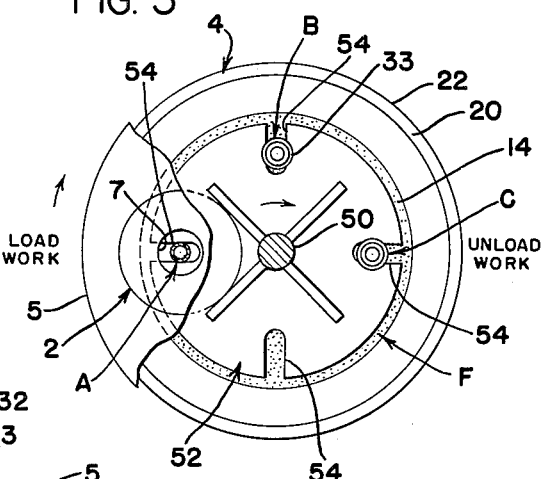
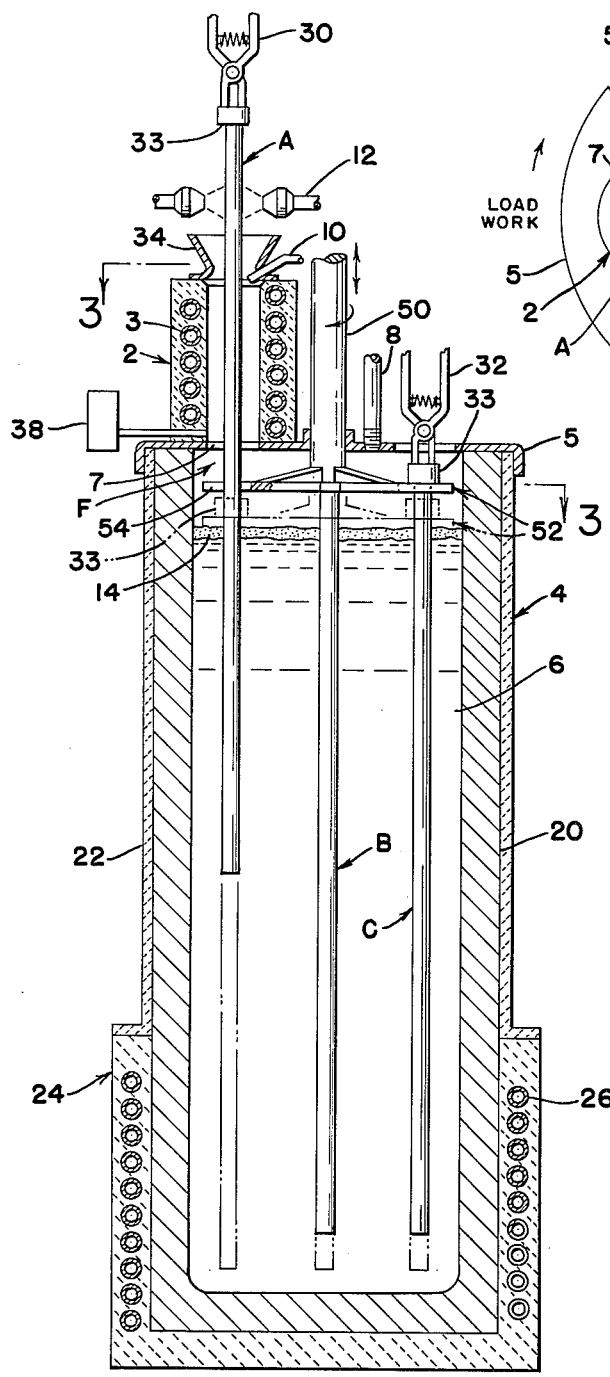
INVENTORS
HARRY W. McQUAID &
WILLIAM L. ULMER
BY
Alfred C. Body
ATTORNEY United States Patent Office
3,203,824
Patented Aug. 31, 1965

3,203,824
METHOD AND APPARATUS FOR CLADDING METAL TUBES
Harry W. McQuaid, 2890 Van Aken Blvd., Cleveland 20, Ohio, and William L. Ulmer, 2480 Kenilworth Road, Cleveland 6, Ohio
Filed Feb. 1, 1962, Ser. No. 170,479
9 Claims. (Cl. 117—51)

This invention relates to the art of cladding metal tubes and bars and more particularly to the method and apparatus for cladding a continuous non-porous coating of metal such as a copper base alloy onto the surfaces of metal tubes.

In the manufacture of coolers, condensers, heat exchangers, steam generators, and other articles that handle a high volume of liquid which in some cases may be corrosive, it is necessary to employ a substantial amount of liquid conduits. These conduits sometimes comprise a metal pipe or tube having an inner layer, an outer layer, or both an inner and outer layer of a metal such as a copper base alloy. Since corrosive liquids are often used it is essential that the copper layer be continuous throughout the entire surface of the pipe or tube to provide an impervious exposed surface on the liquid conduit. In some instances the thickness of the protective coating will be approximately 20% of the total wall thickness of the tube. But, in other applications, such as when the tube is exposed to the atmosphere, the thickness of the protective coating of the metal, such as a copper base alloy, is relatively thin. Thus, in the manufacture of cladded steel tubes for both applications, it is desirable to employ a cladding method and apparatus that can produce either a thin, continuous non-porous coating on the inner or outer surfaces of a tube or, when necessary a thick coating on the surfaces of the tube.

There have been numerous methods and apparatus devised for cladding steel tubes with a material such as a copper base alloy. The previous attempts have not proven completely satisfactory and, for this reason, the cladded tubes have been relatively expensive. Many times the expense of the cladded tubes exceeded the cost of copper or brass tubes, so copper or brass tubes were used even though only the exposed surface needed the protection afforded by the copper alloy and the tubes lacked the strength of steel tubes. Since many installations require a substantial amount of this protected tubing, the cost of the installation has accordingly been substantially increased. The prior attempts to clad steel tubes with copper base alloys incorporated separate fluxing and coating steps; therefore, continuous contact of the flux was prevented and it was nearly impossible to prevent oxides from forming on the surface of the tube. These oxides prevented a continuous non-porous coating or caused surface imperfections that would result in separation of the coating during use. If only a thin coating is necessary, as when the tube is to be exposed to natural atmospheric conditions, the presence of oxides on the surface of the steel was more acutely detrimental because the continuity of the coating could not be obtained by bridging the coating over the impurities. Thus, it was necessary in the past to use a substantially greater thickness of copper on the tube surface to assure continuity of the coating, even though such thickness was not required for the particular application for which the tube was being produced. This increase in thickness of the coating added unnecessarily to the cost of the tube. The prior attempts to coat copper or similar material on the surfaces of steel tubes also presented substantial difficulties in providing a continuous coating that was fusion bonded to the tube, especially on the internal surface of the tube where fluxing was difficult. With these difficulties many installations which required a tube having an inner layer of copper or copper base alloy used a composite tube wherein a copper tube was expanded in a steel tube. This solution presents obvious disadvantages since there was only a mechanical bond between the copper and the steel so the layers would separate.

This invention relates to a method and an apparatus for cladding steel tubes with a continuous non-porous coating of a copper base alloy, or a similar material, which substantially eliminates the difficulties encountered in the prior cladding installations. Although the invention will be discussed in connection with cladding the inner and outer surfaces of a steel tube, the invention may be employed to coat the outer surface of a steel bar. It is also within the contemplation of the invention to use the method and apparatus for cladding the inner or the outer surface of the tube separately. Although these various operations may be accomplished by using the novel method and apparatus, the method and apparatus will be discussed in connection with the cladding of both the inner and outer surfaces of steel tubes.

The invention incorporates the use of a volatile boron base gaseous flux of the type disclosed in French Patent No. 814,136 which has as its principal ingredient an alkyl of borate such as methyl borate, ethyl borate, propyl borate, isopropyl borate or mixtures of these borates.

In accordance with the present invention, there is provided a method of fusion bonding a continuous non-porous coating of a copper base alloy, or similar metal, onto the surfaces of a metal tube comprised of the steps of cleaning the tube, heating the tube in an atmosphere of gaseous boron base flux, providing a molten bath of copper base alloy, or similar material, also in an atmosphere of gaseous boron base flux, and inserting the heated tube into the bath of molten metal at a controlled speed without removing the tube from the atmosphere of gaseous boron base flux so the metal flows along the surfaces of the tube.

In accordance with another aspect of the present invention, there is provided a novel apparatus for fusion bonding a continuous non-porous coating of copper or similar metal onto the surfaces of a metal tube comprised of a furnace or crucible for holding a bath of molten copper base alloy, or similar metal, having a covering atmosphere of gaseous boron base flux and a heating device having a passage filled with the same gaseous boron base flux. The passage in the heating device is communicated directly to the covering flux atmosphere of the molten copper bath so the steel tube may be passed through the passage and into the molten copper bath while in continuous contact both internally and externally with the gaseous boron base flux.

In accordance with another aspect of the present invention, there is provided a novel apparatus for continuously cladding a continuous non-porous coating of copper base alloy or similar metal, onto the surfaces of successive metal tubes wherein the apparatus comprises a heating furnace for heating the tube, a holding furnace for holding a bath of molten copper base alloy at a predetermined temperature, a gaseous boron base flux filled chamber including the lower portion of the heating furnace and the upper portion of the holding furnace, and a means for feeding the successive tubes through the chamber so the tubes are heated and inserted into the molten copper base alloy without leaving the gaseous boron base flux filled chamber. The continuous apparatus also includes an indexing means to move the successive tubes through the bath of molten copper and an unloading means for removing the tubes from the apparatus.

The term "continuous non-porous coating" as used in the specification and claims refers to a coating wherein the cladded metal is fusion bonded to the base metal over the entire cladded surface. Thus, when the cladded coating is quite thin, there are no points along the surface at which the base metal is exposed. If the cladded coating is relatively thick, there are no points between the cladded coating and the base metal that are not fusion bonded. Thus, if oxides are formed on the surface of the base metal before the cladding is applied, the cladding is not "continuous non-porous" as that phrase is used in the application. The main object of this invention is the provision of a novel method and apparatus for cladding a continuous non-porous coating of copper base alloy, or similar metal, onto the surfaces of a metal tube which method and apparatus are economical, require only a minimum amount of machinery and require only a minimum amount of cladding metal per unit of surface area.

Another object of this invention is the provision of a novel method for cladding the surfaces of a metal tube which method uses a gaseous boron base flux in continuous contact with the surfaces of the metal tube between the steps of heating the tube and the step of inserting the tube into a molten bath of coper base alloy.

Another object of this invention is the provision of a novel apparatus for cladding a continuous non-porous coating of copper onto the surfaces of a metal tube which apparatus has structural features to feed the tube through a heating furnace and into a bath of molten copper without removing the tube from an atmosphere of gaseous boron base flux.

Another object of this invention is the provision of a novel method and apparatus which results in a continuous non-porous coating of copper base or similar material on the inside and the outside surfaces of steel tubes wherein there is a fusion bond between the surfaces of the tube and the coating.

A still further object of this invention is the provision of an apparatus for continuously cladding the surfaces of successive metal tubes with a continuous non-porous coating of copper or similar material which apparatus comprises a heating furnace, means for feeding successive tubes through the furnace, a holding furnace or crucible for holding a molten bath of copper base alloy at a predetermined temperature, means for indexing the successive tubes through the copper bath and means for unloading the successive tubes from the apparatus.

These and other objects and advantages will become apparent from the following description used to illustrate the preferred embodiment of the invention as read in connection with the accompanying drawings in which:

FIG. 2 is a side elevational view of the novel apparatus for continuous cladding successive metal tubes with a continuous non-porous coating of copper base alloy;

FIG. 3 is a top partially sectional view taken along line 3—3 of FIG. 2; and,

FIG. 4 is a side elevational view of a modified feeding mechanism for the novel cladding apparatus.

Figure 1:
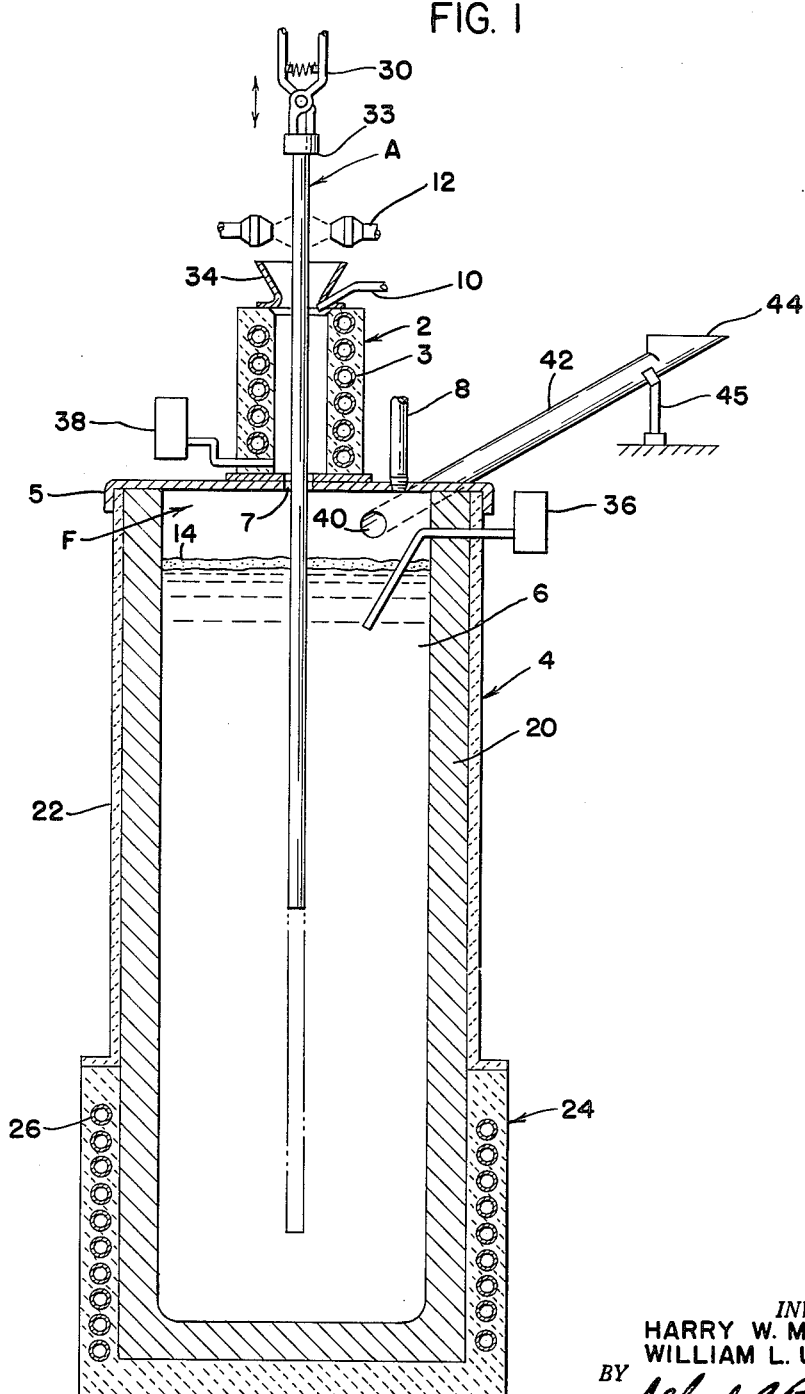
FIG. 1 is a side elevational view of the novel apparatus for cladding metal tubes with a continuous non-porous coating of copper base alloy.

Referring now to the drawings, wherein the showings are for the purpose of illustrating a preferred embodiment of the invention and not for the limiting of same, FIG. 1 shows the basic embodiment of the novel apparatus and method for producing a continuous non-porous coating of copper base alloy, hereinafter referred to as copper, on the inner and outer surfaces of a steel tube A. Although the apparatus is described in connection with the coating of copper onto a steel tube, it is within the contemplation of the invention to apply the novel method and apparatus to the cladding of base metals similar to steel with coating material similar to copper. An induction heating furnace 2 with imbedded induction coil 3 is mounted on the uper surface of a cover 5 whereby the cylindrical opening through the induction furnace is located directly above an aperture 7 leading into a holding furnace or crucible 4. The holding furnace receives a bath of molten copper 6 which has a depth sufficient to cover substantially the entire length of a tube A which is to be cladded with copper. In a position adjacent the upper portion of the holding furnace, an inlet 8 is used to introduce a gaseous boron base flux such as alkyl of borate to completely fill the space of furnace 4 above the molten bath of copper. The term "completely fill" means that all corrosive gases are expelled; however, carrier gases of inert substances may be used with the boron base flux. Thus, this space is void of oxygen which could unite with the steel of the tube A to form a ferrous-oxide or with the copper to form a cupric oxide. The gaseous boron base flux passes into the cylindrical opening through furnace 2 to completely fill this space and prevent oxygen from accumulating therein. To assure a complete gaseous boron base flux atmosphere in the cylindrical opening through the heating furnace 2, an auxiliary flux inlet 10 may be used to introduce additional gaseous boron base flux into the heating furnace 2. Another optional feature of the apparatus is the use of nozzles 12 that direct a flame carrying gaseous boron base flux onto the outer surface of the tube 8 as it descends through the furnace 2 and into the copper bath 6 to preflux the outer surface of the tube. It is also possible to preflux the inner surface by flux flame extending through the tube. A shield 34 partially closes the upper opening of the heating furnace to prevent rapid expulsion of the gaseous flux in the heating furnace and holding furnace. This shield may take a variety of structural forms and may be eliminated if the outflow of flux is not excessive. As thus described, the novel apparatus defines a chamber F comprising the cylindrical opening in the heating furnace 2 and the space above the copper bath in furnace 4, which chamber is completely filled with a gaseous boron base flux such as a substance comprising basically methyl or ethyl borate. The methyl or ethyl borate must react with an oxygeneous material to form oxide which actually accomplishes the fluxing operation which reaction may take place within the chamber F. In practice, although the boron base flux may be used alone, an inert gas is mixed with the flux in the chamber F. The workpiece may be prefluxed in a variety of ways before entering chamber F and in practice a flame containing methyl borate is used.

Due to the high heat conductivity of graphite and the affinity of graphite for oxygen by forming carbon monoxide gas, especially at elevated temperatures, the holding furnace or crucible 4 has a graphite casing 20. The copper bath 6 is held to a temperature of approximately 2100° F., at which temperature the graphite of the casing 20 tends to form carbon monoxide to attract any oxygen in chamber F. However, it is realized that the oxygen can be completely excluded by the gaseous boron base flux which may be used in some cases with a carrier gas. In practice, the graphite may not have adequate tensil strength to hold a large mass of copper, so a stainless steel or similar metal holding furnace may be used. To further reduce the possibility of oxygen in the area above the molten copper, the copper can be covered with a layer of powdered carbon 14. The outer surface of the holding furnace is covered by a refractory insulating casing 22 to hold the heat of the molten copper. Although holding furnace 4 may be heated in any known manner, the holding furnace may be maintained at a substantially uniform temperature by an induction heater 24 having an internal coil 26. The operation of the coil is preferably controlled by a device responsive to the temperature of the copper bath. Such a device could be operable in response to the indication of a pyrometer 36 positioned in the copper bath 6. A pyrometer 38 located in the central passage of the heating furnace could be used to control the power circuit to coil 3 to maintain a uniform temperature of the tube A as it passes through the heating furnace 2.

The tube A is fed through the heating furnace 2 and into the copper bath 6 while in continuous contact with the gaseous boron base flux which fills chamber F. To feed the tube A into the molten bath, a reciprocating member represented as tongs 30 grips the inner surface of a nipple 33 affixed to the upper end of the tube. It is obvious that any number of devices could be used to grip the tube and that the tongs 30 are shown for illustrative purposes only. To provide a uniform heating of the tube as it passes the heating furnace 2, it is advantageous to control the downward speed of tongs 30. No mechanism has been shown in FIG. 1 to control the downward speed; however, a variety of feeding devices may be used, one of which is shown in FIG. 4 and will be described in detail hereinafter.

During the cladding operation, the level of the bath 6 will be decreased; therefore, it is desirable to provide a means for feeding molten copper into the furnace 4. Such a means is represented schematically as a charge hole 40 connected to an inclined chute 42 which terminates in a funnel-shaped inlet 44. The molten copper may be fed through the chute into the furnace 4. Of course, it may be necessary to insulate the chute 42 or even continuously heat the chute by an external heating means. Also, the chute is supported by appropriate means such as brace 45. This charging device may be varied according to the industrial demands and may even take the embodiment of a separate holding furnace connected directly to the holding furnace 4.

In operation of the apparatus, the tube A is heated to a predetermined temperature which is approximately 2000° F. by the heating furnace 2 and the molten bath is maintained at a uniform temperature such as 2100° F. by the induction heater 24. The temperature of the tube and the copper bath may be changed to vary the thickness of the cladded coating or to correspond with temperatures necessary when using other metals. The tongs 30 pass the tube A, which may have been previously fluxed by a boron base gaseous flux carried in a flame, downwardly through heater 2 which raises the temperature of the tube to the predetermined temperature before the tube enters the molten bath of copper 6. As the tube passes through the furnace 2 and into the molten bath of copper, it never leaves chamber F and the boron base flux enters the central opening o fthe tube. Therefore, the tube is in continuous contact with the gaseous boron base flux in chamber F, both inside and outside, which continuous contact is an important aspect of this invention. By this continuous contact the tube is cleaned and no oxygen is present to form oxides on the surface of the tube. Thus, the cladded coating is continuous and non-porous. As the tube passes into the copper, the copper flows upwardly along the inner and outer surfaces of the tube to create a surface turbulence which assists in assuring a continuous non-porous coating on both the inner and the outer surfaces of tube A.

Referring to FIG. 2, where like numerals indicate like parts, a novel apparatus for continuously cladding successive tubes A, B and C is disclosed as having an indexing means for transferring the tubes from a feeding position to an unloading position. Although numerous indexing devices could be used, in the preferred embodiment of this invention, the indexing device comprises a shaft 50 having intermittent reciprocating motion and intermittent rotary motion. The indexing shaft terminates in a generally flat plate 52 provided with angularly spaced slots 54. Various numbers of spaced slots 54 may be provided on the periphery of plate 52; however, four of such slots spaced approximately 90° from each other will suffice. The remainder of the apparatus is substantially the same as discussed in connection with FIG. 1, i.e., there is provided a heating coil 2, a holding furnace 4, and a chamber F between these furnaces which chamber is completely filled with a gaseous boron base flux.

In operation, the tube A is passed downwardly through the cylindrical opening in heating furnace 2 and into the molten bath of copper 6. This downward movement is at a controlled speed and the temperature of the tube is maintained at predetermined themperature. During this feeding operation, the plate 52 is slightly raised and the nipple 33 prevents the tube from passing through slot 54. Thereafter, indexing shaft 50 is lowered and indexed 90° in a direction indicated by the arrows of FIGS. 2 and 3. Thus, the tube is moved to the position of tube B. After another tube A is fed into the holding furnace 4, the indexing shaft 50 indexes another 90° to locate the tube in the position of tube C at which position an unloading device indicated schematically as a tong 32, reaches into the furnace and removes the tube C. The apparatus continuously operates with a tube being fed into the apparatus and a tube being unloaded from the apparatus during each cycle. It is possible to have a quenching device to quench the tube as it is removed from the apparatus. The time between the cycles, the number of steps in the cycle between the feeding and the unloading stations, taken in connection with the temperature of the tube and the temperature of the molten copper, determines the thickness of the copper deposited on the surfaces of the tube. Variation in such parameters will result in the desired thickness; however, in all instances the coating of copper will be continuous non-porous.

As was mentioned, it is desirable to feed the tube A into the apparatus at a controlled rate. One device for accomplishing this feed is shown in FIG. 4 wherein the tube A has an upper nipple 33 in which is positioned an expanding mandrel 60 supported by feeder rod 66. Expansion of the mandrel takes place on upward movement of a cam 62 by actuator rod 64 extending coaxially through feeder rod 66. The actuator rod 64 is operated by a solenoid 65 mounted on the feeder rod 66 and controlled by a switch 63. A controlled speed pinion gear 68 meshes with a rack portion 67 of the feeder rod 66 to move the shaft downwardly at a controlled rate of feed. This feeding mechanism is only representative and various devices may be used. One of such devices is a reversing chain that carries a lug which engages the upper portion of the tube A and moves the tube into and out of the molten copper bath.

The novel method and apparatus for cladding the surfaces of a metallic tube with a continuous non-porous coating has been described in conjunction with particular structural embodiment; however, it is not intended that the structural aspects of embodiment should limit the scope of the invention. It is obvious that if selected areas of the tube are to remain uncoated by the copper or similar material, the area may be masked off before the cladding operation.

It is also realized that the bottom of the tube may be closed off and only the outer surface cladded. Another ramification would be to use the novel method and apparatus to clad the external surface of a bar or shaft. It is obvious that various changes of parts and arrangement of parts may be accomplished without departing from the scope and spirit of the invention as defined by the appended claims.

Having thus described our invention, we claim:
1. A method of cladding a first metal in the form of an elongated bar-like member with a continuous, non-porous coating of a second metal comprised of the following steps: cleaning said member, heating said member to a temperature beyond the melting point of the second metal but below the melting point of the first metal, simultaneously subjecting said member to an atmosphere of gaseous boron base flux, providing a molten bath of said second metal, filling the space above said bath with gaseous boron base flux to exclude all corrosive gases and passing said member into said bath while all heated surface area of said member is in continuous contact with said gaseous boron base flux until said area is dipped into said bath.

2. The method as defined in claim 1 comprising the additional step of feeding said member into said bath at a predetermined linear speed.

3. The method as defined in claim 1 wherein said first metal is steel and said second metal is a copper base alloy.

4. A method of cladding the inner and outer surfaces of a tube formed from a first metal with a continuous, non-porous coating of a second metal comprising the following steps: cleaning the tube, progressively heating the surfaces of the tube to a predetermined temperature below the melting point of the first metal and close to the melting point of the second metal, simultaneously subjecting the inner and outer surface of said tube to an atmosphere of gaseous boron base flux, moving said tube downwardly at a predetermined rate into a molten bath of said second metal to create a surface turbulence at the inner and the outer surface of said tube, providing a chamber comprising the space above said molten bath, filling said chamber with a gaseous boron base flux to exclude all corrosive gases, and maintaining said heated inner and outer surfaces of said tube in said chamber until said heated surface is passed into said molten bath of said second metal.

5. The method as defined in claim 4 wherein said first metal is steel and said second metal is a copper base alloy.

6. A method of cladding a first metal in the form of an elongated bar-like member with a continuous, non-porous coating of a second metal comprised of the following steps: cleaning said member, prefluxing said member, heating said member to a temperature beyond the melting point of the first metal, simultaneously subjecting said member to an atmosphere of a gaseous boron base flux and an inert gas, providing a molten bath of said second metal, filling the space above said bath with gaseous boron base flux and an inert gas and passing said member into said bath while all heated surface area of said member is in continuous contact with said gaseous boron base flux and inert gas until said area is dipped into said bath.

7. A method of cladding a first metal in the form of an elongated bar-like member with a continuous, non-porous coating of a second metal comprised of the following steps: cleaning said member, prefluxing said member, heating said member to a temperature beyond the melting point of the first metal, simultaneously subjecting said member to an atmosphere of a gaseous boron base flux carried in a neutral gas, providing a molten bath of said second metal, filling the space above said bath with gaseous boron base flux carried in a neutral gas and passing said member into said bath while all heated surface area of said member is in continuous contact with said gaseous boron base flux and inert gas until said area is dipped into said bath.

8. The method as defined in claim 7 wherein said neutral gas is nitrogen.

9. The method as defined in claim 7 wherein said neutral gas is natural gas.

References Cited by the Examiner

UNITED STATES PATENTS

| | | | |
|---|---|---|---|
| 2,323,666 | 7/43 | Medsker. | |
| 2,405,592 | 8/46 | Mauger et al. | 117—51 |
| 2,701,546 | 2/55 | Townsend | 118—426 |
| 2,762,115 | 9/56 | Gates | 148—23 X |
| 2,771,056 | 11/56 | Hess | 117—94 X |
| 2,950,991 | 8/60 | Seymour | 118—69 X |
| 3,010,844 | 11/61 | Klein et al. | 117—51 |

RICHARD D. NEVIUS, *Primary Examiner.*